(12) United States Patent
Klevenz et al.

(10) Patent No.: US 7,620,908 B2
(45) Date of Patent: Nov. 17, 2009

(54) MANAGING A USER INTERFACE

(75) Inventors: Stephan Klevenz, Heidelberg (DE); Jan Heiler, Schwetzingen (DE); Dirk Basenach, St-Leon (DE)

(73) Assignee: SAP AG, Walldorf (DE)

( * ) Notice: Subject to any disclaimer, the term of this patent is extended or adjusted under 35 U.S.C. 154(b) by 679 days.

(21) Appl. No.: 10/330,036

(22) Filed: Dec. 26, 2002

(65) Prior Publication Data

US 2003/0137540 A1 Jul. 24, 2003

Related U.S. Application Data

(60) Provisional application No. 60/346,442, filed on Dec. 28, 2001.

(51) Int. Cl.
*G06F 3/048* (2006.01)

(52) U.S. Cl. .................. 715/781; 715/806; 715/829

(58) Field of Classification Search .............. 715/762, 715/781, 806, 829
See application file for complete search history.

(56) References Cited

U.S. PATENT DOCUMENTS

| | | | |
|---|---|---|---|
| 5,920,315 A * | 7/1999 | Santos-Gomez | 715/792 |
| 6,278,449 B1 * | 8/2001 | Sugiarto et al. | 715/826 |
| 6,317,781 B1 | 11/2001 | De Boor et al. | |
| 6,819,343 B1 * | 11/2004 | Sobeski et al. | 715/848 |
| 7,000,008 B2 * | 2/2006 | Bautista-Lloyd et al. | 709/219 |
| 7,120,914 B1 * | 10/2006 | Manthos et al. | 718/108 |
| 2002/0109734 A1 * | 8/2002 | Umezu et al. | 345/846 |
| 2003/0011635 A1 * | 1/2003 | Hasha et al. | 345/762 |
| 2003/0043192 A1 * | 3/2003 | Bouleau | 345/762 |
| 2003/0071842 A1 * | 4/2003 | King et al. | 345/762 |

FOREIGN PATENT DOCUMENTS

| | | |
|---|---|---|
| EP | 1 156 427 | 11/2001 |
| EP | 1 164 473 | 12/2001 |
| WO | WO 01/77822 | 10/2001 |

OTHER PUBLICATIONS

David Geary, "Apache Struts: A Web Application Framework", JAVA Report, Nov. 2000, XP002279161, pp. 1-5.
Marc Abrams and Constantinos Phanouriou, "UIML: An XML Language for Building Device-Independent User Interfaces", Dec. 1999, XP002161335, pp. 1-15.
PCT International Search Report, International Application No. PCT/IB02/05788, Intl. Filing Date Dec. 27, 2002, pp. 1-6.
uidesign.net, WhitePaper, Server-side MVC Architecture—Part 1, $2^{nd}$ Edition, revised and republished Jun. 2000, http://www.uidesign.net/1999/papers/webmvc_part1.html, pp. 1-13, Oct. 1999.

(Continued)

*Primary Examiner*—Boris Pesin
(74) *Attorney, Agent, or Firm*—Mintz, Levin, Cohn, Ferris, Glovsky and Popeo, P.C.

(57) ABSTRACT

Systems and techniques for managing a user interface are disclosed. In general, in one implementation, a technique includes: generating a page for a user interface, the page comprising a pane; receiving an indication of user interaction with a portion of the page; determining an event associated with the indicated interaction; and selectively generating a replacement pane based on the event determination.

44 Claims, 8 Drawing Sheets

OTHER PUBLICATIONS uidesign.net, WhitePaper, Server-side MVC Architecture—Part 2, $2^{nd}$ Edition, revised and republished Jun. 2000, http://www.uidesign.net/1999/papers/webmvc_part2.html, pp. 1-18, Dec. 1999.

uidesign.net, WhitePaper, Server-side MVC Architecture-Part 3, Clients, Transactions and Exceptions, http://www.uidesign.net/2000/papers/webmvc1a.html, pp. 1-14, Jul. 29, 2000.

Java World, Understanding JavaServer Pages Model 2 architecture, Exploring the MVC design pattern, http://www.javaworld.com/javaworld/jw-12-1999/jw-12-ssj-jspmvc_p.html, pp. 1-14, Dec. 1999.

The Apache Jakarta Project, Struts, http://jakarta.apache.org/struts/index.html, pp. 1-2, 2000.

The Apache Jakarta Project, Struts, Table of Contents, http://jakarta.apache.org/struts/userGuide/printer/index.html, pp. 1-3, 2000.

The Apache Jakarta Project, Struts, Preface, http://jakarta.apache.org/struts/userGuide/printer/preface.html, pp. 1-14, 2000.

The Apache Jakarta Project, Struts, Introduction, http://jakarta.apache.org/struts/userGuide/printer/introduction.html, pp. 1-7, 2000.

The Apache Jakarta Project, Struts, Building Model Components, http://jakarta.apache.org/struts/userGuide/printer/building_model.html, pp. 1-4, 2000.

The Apache Jakarta Project, Struts, Building View Components, http://jakarta.apache.org/struts/userGuide/printer/building_view.html, pp. 1-12, 2000.

The Apache Jakarta Project, Struts, Building Controller Components, http://jakarta.apache.org/struts/userGuide/printer/building_controller.html, pp. 1-18, 2000.

The Apache Jakarta Project, Struts, Configuring Applications, http://jakarta.apache.org/struts/userGuide/printer/configuration.html, pp. 1-18, 2000.

The Apache Jakarta Project, Struts, Release Notes, http://jakarta.apache.org/struts/userGuide/printer/release-notes.html, pp. 1-15, 2000.

The Apache Jakarta Project, Struts, Installation, http:jakarta.apache.org/struts/userGuide/printer/installation.html, pp. 1-8, 2000.

* cited by examiner

Panes

```
<WDF:Panes >

<WDF:Pane id="Pane1" layoutClass="com.sap.wcm.wdf.layout.HorizontalLayout" >
        <WDF:PaneReference paneRefID="Pane2" />
        <WDF:PaneReference paneRefID="Pane3" />
    </WDF:Pane>

<WDF:Pane id="Pane2" layoutClass="com.sap.wcm.wdf.layout.VerticalLayout" >
        <WDF:ControlReference controlRefID="Control1" />
        <WDF:ControlReference controlRefID="Control5" />
        <WDF:ControlReference controlRefID="Control6" />
    </WDF:Pane>

<WDF:Pane id="Pane3" layoutClass="com.sap.wcm.wdf.layout.VerticalLayout" >
        <WDF:ControlReference controlRefID="Control2" />
        <WDF:ControlReference controlRefID="Control3" />
        <WDF:NextScreen eventClass="com.sap.wcm.wdf.event.WdfBackEvent" producerControlRefID="Control3">
            <WDF:BackPane popCount="1" />
        </WDF:NextScreen>
        <WDF:NextScreen eventClass="com.sap.wcm.wdf.testcontrols.CounterEvent" producerControlRefID="Control3">
            <WDF:NextPane nextPaneRefID="Pane4" push="true" />
        </WDF:NextScreen>
    </WDF:Pane>

<WDF:Pane id="Pane4" layoutClass="com.sap.wcm.wdf.layout.HorizontalLayout" >
        <WDF:ControlReference controlRefID="Control4" />
        <WDF:NextScreen eventClass="com.sap.wcm.wdf.event.WdfBackEvent" producerControlRefID="Control4">
            <WDF:BackPane popCount="1" />
        </WDF:NextScreen>
        <WDF:NextScreen eventClass="com.sap.wcm.wdf.testcontrols.CounterEvent" producerControlRefID="Control4">
            <WDF:NextPane nextPaneRefID="Pane3" push="true" />
        </WDF:NextScreen>
    </WDF:Pane>
    ...
</WDF:Panes >

/WDF:Panes >
```

Controls

```
<WDF:Controls>

⎧  <WDF:Control id="Control1" class="com.sap.wcm.wdf.testcontrols.Control1" >
450a ⎨      <WDF:Parameter name="MyParameterAsString" value="Abc" />    ⎫ 462
      ⎩      <WDF:Parameter name="MyParameterAsFloat" value="1.95583" /> ⎭
         </WDF:Control>

450b ⎰ <WDF:Control id="Control2" class="com.sap.wcm.wdf.testcontrols.Control2" >
     ⎱ </WDF:Control>

⎧ <WDF:Control id="Control3" class="com.sap.wcm.wdf.testcontrols.Control3" >
450c ⎨     <WDF:Parameter name="Value" value="-" />
     ⎩     <WDF:Parameter name="Count" value="0" />
        </WDF:Control>

⎧ <WDF:Control id="Control4" class="com.sap.wcm.wdf.testcontrols.Control4" >                       ⎫
450d ⎨     <WDF:EventFilter eventClass="com.sap.wcm.wdf.CounterEvent" producerControlRefID="Control5" /> ⎬ 494
     ⎩ </WDF:Control>                                                                                    ⎭

⎧ <WDF:Control id="Control5" class="com.sap.wcm.wdf.testcontrols.Control3" >
450e ⎨     <WDF:Parameter name="Value" value="-" />
     ⎩     <WDF:Parameter name="Count" value="100" />
        </WDF:Control>

⎧ <WDF:Control id="Control6" class="com.sap.wcm.wdf.testcontrols.Control4" >
450f ⎨     <WDF:EventFilter eventClass="com.sap.wcm.wdf.CounterEvent" producerControlRefID="Control3" />
     ⎩ </WDF:Control>
       .....

</WDF:Controls>
```

FIG. 4B

MANAGING A USER INTERFACE

CROSS REFERENCE TO RELATED APPLICATIONS

This application claims the benefit of priority from U.S. Provisional Application No. 60/346,442, entitled "WEB DEFINITION FRAMEWORK" and filed on Dec. 28, 2001, the disclosure of which is incorporated by reference.

COPYRIGHT NOTICE

A portion of this disclosure contains material that is subject to copyright protection. Specifically, portions of source code, scripting language, and/or program model and design information appear in the specification. The copyright owner has no objection to the facsimile reproduction of the specification as filed. Otherwise, all copyright rights are reserved.

BACKGROUND

The present application describes systems and techniques relating to user interfaces, for example, for managing a user interface.

A user interface offers a convenient way for a user to interact with an application. For example, a user interface may present data of an application in an organized format. Furthermore, a user interface may allow a user to navigate through data and select certain data for more detailed analysis. Additionally, a user interface may contain a data entry portion. Thus, a user interface may present data to and receive data from a user for an application.

Typically, a user interface is programmed with, i.e., built as part of, the application that it is designed to support. Thus, the user interface is part to the application and, accordingly is tailored thereto. Additionally, some user interfaces implement page flow in a mapping table where events are mapped to page locators, allowing movement in the user interface on a page level. Doing so allows the pages to represent the state of the model reflected by the table.

SUMMARY

The present application teaches managing a user interface. In one aspect, a system and method for managing a user interface include the ability to generate a page for a user interface, the page comprising a pane, and to receive an indication of user interaction with a portion of the page. The system and method also include the ability to determine an event associated with the indicated interaction and to selectively generate a replacement pane based on the event determination.

In particular aspects, selectively generating a replacement pane based on an event determination comprises determining whether the event is associated with replacing a pane and generating a replacement pane if the event is associated with replacing the pane.

In certain aspects, selectively generating a replacement pane based on an event determination comprises determining whether a previously used pane should replace a pane.

In particular aspects, generating a replacement pane comprises examining a user interface state to determine information about a previously used pane.

In some aspects, a system and method for managing a user interface include the ability to receive a user interface state, to update the user interface state, and to send the user interface state.

In certain aspects, a user interface state is included with a message containing information regarding a replacement pane.

In particular aspects, a user interface state comprises a navigation state stored in a stack structure, and examining a user interface state comprises popping the stack structure to determine information about a previously used pane.

In some aspects, selectively generating a replacement pane based on an event determination comprises determining whether another pane should replace the pane.

In certain aspects, a system and method for managing a user interface include the ability to place information about a replacement pane in a user interface state.

In particular embodiments, a user interface state comprises a navigation state stored in a stack structure, and placing information about a replacement pane in a user interface state comprises pushing information about the replacement pane onto the stack structure.

In some aspects, selectively generating a replacement pane based on an event determination comprises examining a configurable file.

In certain aspects, a system and method for managing a user interface include the ability to determine whether an event is associated with a different page and to generate the different page if the event is so associated.

In particular aspects, a system and method for managing a user interface include the ability to send a generated page to a user interface device.

In some aspects, a system and method for managing a user interface include the ability to embed data in an event and to send the event to a plurality of controls.

In certain aspects, a control is operable to filter an event and to extract data from an event.

In particular aspects, a method for managing a user interface includes the ability to specify a page for a user interface in a configuration file, the page comprising a pane, and to specify an event associated with replacement of the pane.

In certain aspects, specifying an event associated with replacement of a pane comprises specifying an operation to be performed on a user interface navigation state.

In some aspects, specifying an event associated with replacement of a pane comprises specifying whether a previously used pane should replace the pane.

In particular aspects, specifying whether a previously used pane should replace a pane comprises specifying an operation to be performed on a user interface navigation state.

In certain aspects, specifying an operation to be performed on a user interface navigation state comprises specifying a pop operation for a stack structure.

In some aspects, specifying an event associated with replacement of a pane comprises specifying whether another pane should replace the pane.

In particular aspects, specifying whether another pane should replace a pane comprises specifying that information about the replacement pane should be pushed onto a stack structure.

The systems and techniques discussed herein have a variety of features. For example, a system and technique may allow a developer to specify page layout and page flow of an application in a configuration file. This allows a developer to readily alter an application by modifying the configuration file. It also lets a developer create different versions of an application by creating slightly different versions of the configuration file. This makes it easy to customize the application, which is beneficial because one customer may prefer a more streamlined application while another customer may prefer a more user-friendly application. Furthermore, this reduces coding effort because all of the different possible page layouts do not have to be hard-coded into a controller. Moreover, it may provide content developers with an easy-to-use library of controls, which may be browser independent. Thus, an application developer may not have to code in a user interface language and, instead, may focus on the logic of the application. As another example, a system and technique may allow for finer-grained navigation than on a page level. Moreover, the navigation may be fluid as it may proceed forward and/or backward and different actions for a control may affect the navigation differently. In particular embodiments, a state of a user interface is stored at a user interface device. This allows scalability of the server because there is no data hold into the memory and the obsolete session time out (e.g., close browser window and the application state is gone). Moreover, if the application is stateless at the server, the state may be used to facilitate user interface navigation. As a further example, a system and technique may have controls and renderers located at a central location, allowing the controls to be centrally rendered, which provides for consistent rendering of the controls. Moreover, this may support messaging between controls, through events.

Details of one or more implementations are set forth in the accompanying drawings and the description below. Other features will be apparent from the description and drawings, and from the claims.

BRIEF DESCRIPTION OF THE DRAWINGS

These and other aspects will now be described in detail with reference to the following drawings:

FIGS. 4A-B provide an example of a configuration file that may be used to facilitate specification of a flow similar to that illustrated in FIG. 3;

Like reference symbols in the various drawings indicate like elements.

DETAILED DESCRIPTION

The systems and techniques described herein relate to managing a user interface. A user interface may have any type of format for presenting data to a user and/or facilitating the receipt of input from a user.

Figure 1:
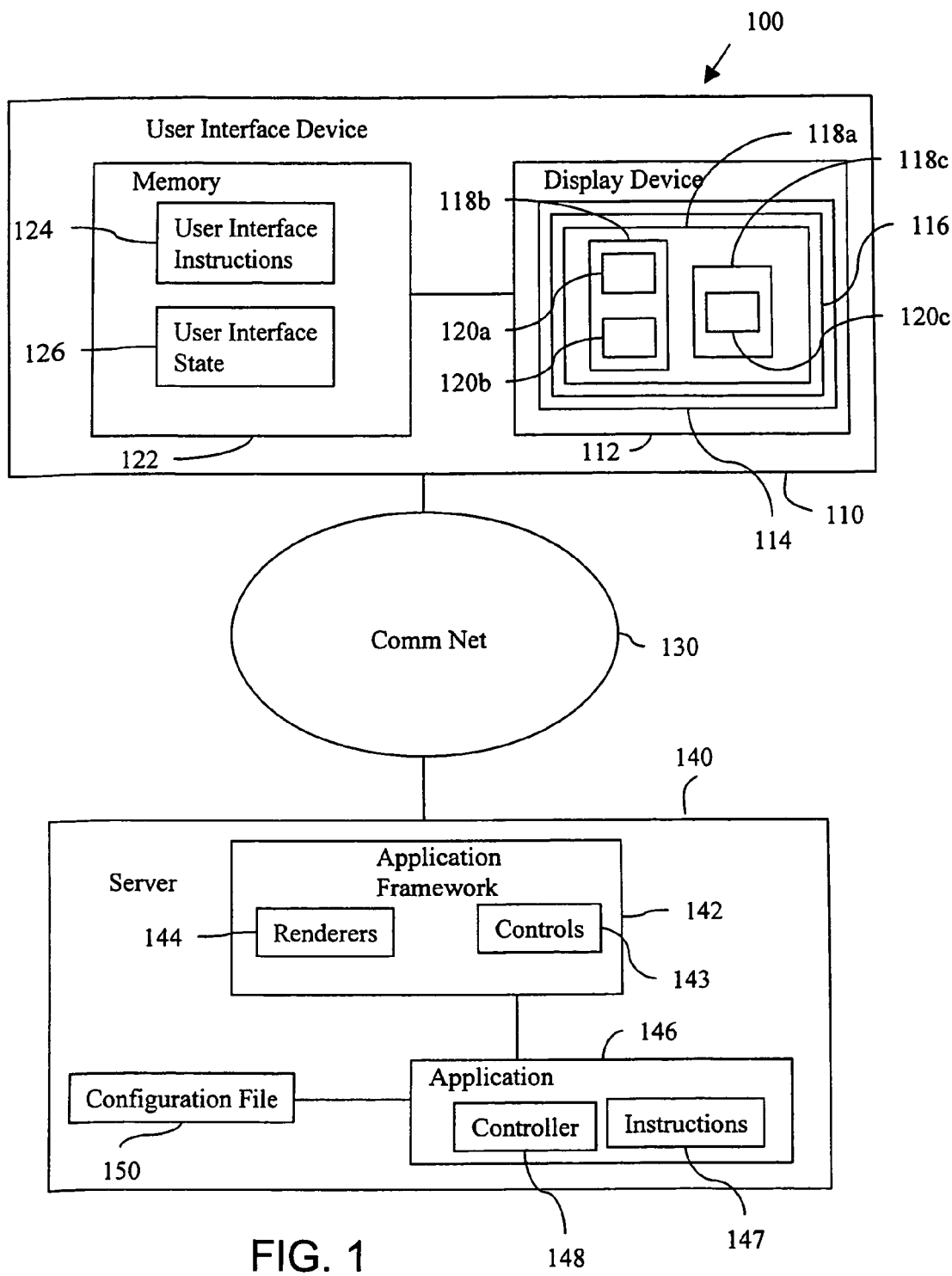
FIG. 1 is a block diagram illustrating a system for managing a user interface in accordance with one embodiment of the present invention.

FIG. 1 is a block diagram illustrating a system 100 for managing a user interface in accordance with one embodiment of the present invention. In general, system 100 includes a user interface device 110, a communication network 130, and a server 140. In operation, server 140 generates a user interface and communicates it to user interface device 110 via communication network 130. User interface device 110, in turn, displays the user interface. User interface device 110 also detects user interaction with the user interface and communicates messages indicative of the interaction to server 140. Server 140 may take appropriate actions based on the received messages, such as, for example, updating the user interface or performing an operation based on information entered in the user interface. In particular embodiments, system 100 is a native Web infrastructure based on open standards, to allow access to information in a variety of formats.

In more detail, user interface device 110 includes a display device 112 and a memory 122. Display device 112 is operable to display a user interface 114 and may be a cathode-ray-tube display, a liquid-crystal display, or any other appropriate type of device for displaying information. User interface 114 may be a graphics-based user interface, a text-based user interface, or any other appropriate type of format for presenting information.

As illustrated, user interface 114 includes a page 116, also known as a screen, that is itself composed of panes 118. A pane may be rectangular, square, elliptical, circular, or any other appropriate shape. As illustrated, pane 118a contains pane 118b and pane 118c. Additionally, pane 118b contains controls 120a-b and pane 118c contains control 120c. A control is basically a container for widgets that are displayed in the user interface. Thus, a control could be a composite of input fields, labels, buttons, and other fields. An example of controls is a "name" control and an "address" control for a shipping function. The "address" control, for instance, may contain five widgets: two input fields for entering street address, one drop-down box for choosing state, one input field for entering zip code, and one "ok" button to indicate that the address is complete. As illustrated by the controls example, user interface 114 may also facilitate the receipt of input from a user, such as, for example, the input of information and the selection of an action associated with information and/or a control.

In general, a user interface such as user interface 114 may have one page, a page may have one or more panes, and a pane may have one or more controls. Of course, a display device may display more than one user interface, by, for example, using frames. Furthermore, demarcations for pages and panes may or may not be observable. Additionally, controls are not generally specific to panes and, hence, may be reused in different panes. Moreover, any arrangement of pages, panes, and controls may be used in a user interface. In particular embodiments, a page may contain a mini-application, such as, for example, a Java applet.

Memory 122 includes user interface instructions 124 and user interface state 126. User interface instructions 124 contain the logic for displaying the user interface generated by server 140. In particular embodiments, user interface instructions 124 are logic for a Web-browser. User interface state 126 stores a state of the user interface, to be discussed in more detail below. In particular embodiments, user interface state 126 is received and stored as part of a HyperText Markup Language (HTML) page. Memory 122 may include random-access memory (RAM), read-only memory (ROM), compact-disc read-only memory (CD-ROM), registers, and/or any other type of volatile or non-volatile electromagnetic or optical data storage device. Furthermore, memory 122 may include other instructions and/or storage areas.

User interface device 110 may include any other appropriate type of devices for facilitating the display of information from server 140 and/or receiving user input. Such devices could include network interface devices, processing devices, and user input devices. In particular embodiments, user interface device 110 may operate as a client to server 140.

Communication network 130 may include any appropriate type of devices for relaying information between logical devices. For example, communication network 130 may include routers, switches, bridges, repeaters, and/or transceivers. Furthermore, communication network 130 may use wires, fiber-optic cables, wireless channels, and/or any other appropriate type of links. Additionally, communication network 130 may send information using packet-switched and/or circuit-switched techniques. In particular embodiments, communication network 130 is the Internet and, hence, operates according to Internet protocols.

Server 140 is basically a framework for information deployment. Server 140 may use any appropriate type of transport protocol, such as for example, HyperText Transport Protocol (HTTP) or Wireless Access Protocol (WAP), for sending information and any appropriate type of user interface generation language, such as, for example, HTML, Extensible Markup Language (XML), or Wireless Markup Language (WML), for generating a user interface. In particular embodiments, server 140 is a framework to provide Web applications.

As illustrated, server 140 includes an application framework 142, an application 146, and a configuration file 150. Of course, server 140 could include multiple application frameworks, applications, configuration files, and/or other components.

Application framework 142 includes controls 143 and renderers 144. Controls 143 correspond to controls 120 in user interface 114. Renderers 144 are responsible for generating the representations of the controls and other information that is to be presented in the user interface. Controls 143 and renderers 144 may be reusable between applications, user interfaces, pages, and/or panes. Framework 142 may operate according to HTML for Business (HTMLB) or any other appropriate presentation framework.

In particular embodiments, controls can send and receive events. Furthermore, controls may pass data to each other by placing the data in an event and passing the event to all controls. For example, when a billing-related control receives address data for a user, it may forward the data to a shipping-related control. In certain embodiments, controls can inherit features from other controls.

Application 146 includes instructions 147 and a controller 148. Instructions 147 specify the operations necessary to implement a process. For example, system 100 could be useful for implementing a business process, and instructions 147 could specify the operations to be accomplished in executing the business process. Business process instructions are commonly provided by companies such as SAP, BAAN, Peoplesoft, and the like. Controller 148 is responsible for handling the flow of user interface 114. To accomplish this, controller 148 examines configuration file 150, which specifies the flow. In particular embodiments, application 146 is a Web application.

Configuration file 150, as mentioned previously, contains the logic for the flow of the user interface. Configuration file 150 may be written in XML or any other appropriate language. In particular embodiments, configuration file 150 may conform to a document type definition and, hence, be validated prior to run time.

Application framework 142, application 146, and configuration file 150 may be encoded in any appropriate type of volatile or non-volatile electromagnetic or optical media. Server 140 may also include any other appropriate type of devices for assisting in retrieving, manipulating, and sending information. Such devices could include network interface devices, processing devices, and storage devices. In particular embodiments, server 140 may be a Java 2 Platform, Enterprise Edition (J2EE) Web server and may function as a portal.

In operation, configuration file 150 specifies the composition of user interface 114—from pages to panes to controls. Controller 148 is responsible for determining the composition of user interface 114 based on the information in configuration file 150. Controller 148 then instructs framework 142 as to which controls to use and their organization, and renderers 144 are responsible for rendering the information for the user interface. The generated user interface is sent to user interface device 110 through communication network 130, along with a user interface state. In particular embodiments, a user interface state is hidden in HTML code sent to user interface device 110 and is stored in hidden input fields at the user interface device. Using user interface instructions 124, user interface device 110 displays the user interface on using display device 112.

When user interface device 110 detects user interaction with user interface 114, possibly by detecting a signal from a user input device and associating the signal with a particular portion of user interface 114, user interface device 110 generates a message for server 140 regarding the interaction. User interaction could consist of the entry of information, the selection of information, the activation of a button, or any other appropriate user interaction with a user interface. User interface device 110 also sends the user interface state, possibly with the interaction message, to server 140.

When server 140 receives the message, it passes the message to application framework 142, which sends it to the appropriate control 143. The control is operable to determine what occurred—information entry, information selection, button activation, or otherwise—and to generate an event corresponding to the interaction. An event may be a simple Java class derived from a base event class that can contain additional data. The event, however, is typically generic—for example, indicating that a button was selected. The event is sent to application 146, where controller 148 may restore the previous user interface state, or previous page, of the application using the received user interface state and/or information from configuration file 150. In particular embodiments, the user interface state only stores a small amount of data due to the fact that a large amount of information about a controller or pane can be restored from configuration file 150. For example, navigation state data may be extended by application data, which may be used to restore the inner state of a control. Furthermore, controller 148 can turn the generic event into an application specific event. For instance, if a button entitled "Search" is activated, the controller can generate an "onSearch" event. Logic 147 may be applied to the event as necessary. For example, if information entry has occurred, logic 147 may determine a result based on the information. Controller 148 also determines whether a change to the user interface is to occur. For example, an interaction may be associated with replacing a pane of a page with another pane or a previously used pane. If so, controller 148 could inform application framework 142 of the control(s) 143 to substitute for previous control(s) 143. As another example, an interaction could be associated with an entirely new page. If so, controller 148 could instruct application framework 142 as to the composition of the new page—panes, controls, and arrangement, for example. Controller 148 also updates the user interface state. Application framework 142 could then render the new components and send the rendered data to user interface device 110 for display, along with the updated user interface state.

System 100 has a variety of features. For example, the system allows a developer to specify page layout and flow for an application in configuration file 150. This allows a developer to readily alter an application by modifying the configuration file. It also lets a developer create different versions of an application by creating slightly different versions of the configuration file. For instance, a developer could add a "Confirm Order" page by simply adding an appropriate description to the configuration file. This makes it easy to customize the application, which is beneficial because one customer may prefer a more streamlined application without a particular page while another customer may prefer a more user-friendly application. Furthermore, this reduces coding effort because all of the different possible page layouts do not have to be hard-coded into the controller. Moreover, it may provide content developers with an easy-to-use library of controls, which may be browser independent. Thus, an application developer may not have to code in a user interface language such as HTML and, instead, may focus on the logic of the application. As another example, system 100 allows for finer-grained navigation than on the page level. For instance, system 100 allows navigation on the pane level. Moreover, the navigation is very fluid as it may proceed forward or backwards and different actions for a control may affect the navigation differently. Another example is that a state of the user interface is stored at the user interface device. This allows scalability of the server because there is no data hold into the memory and the obsolete session time out (e.g., close browser window and the application state is gone). Moreover, if the application is stateless at the server, as with an HTTP-based application, the state may be used. As a further example, the controls and renderers are located at a central location. Thus, the controls are centrally rendered, which provides for consistent rendering of the controls. As a further example, this supports messaging between controls, through events.

In particular embodiments, server 140 includes an abstraction layer and a service directory. The abstraction layer is operable to extract, correlate, and/or understand information and logic in an enterprise infrastructure. In accomplishing this, the abstraction layer may aggregate and classify the information. For example, the abstraction layer may use metadata to categorize documents into multiple taxonomies, for browsing and/or retrieval. In particular embodiments, the layer stores pointers to documents in a folder hierarchy, which ensures non-redundant storage and allows access control to be tied to the roles of users. The service directory, in turn, stores information regarding a user of system 100. For example, the service directory may store information regarding attributes that a user possesses for a certain role. For instance, a user that is a system administrator may be able to access and change all types of information in the enterprise infrastructure, but a user that is a content provider may only be able to access and change certain types of information in the enterprise infrastructure. Furthermore, the service directory could store information regarding personal preferences of a user. Application framework 142 may be operable to determine how to present information to a user while taking into account a user's role—administrator, casual user, content provider, or otherwise.

An enterprise infrastructure may contain resources, which could include data and applications. Data could include folders, documents, files, databases, Web content, business analytics, and/or any other appropriate grouping of information, whether structured or unstructured. The information itself could be technical papers, presentations, drawings, calculation sheets, and/or on-line discussions, for example. Furthermore, information could include information about data. Applications, in turn, could contain logic that implements business processes. The applications could perform any appropriate function for a business process, such as, for example, order entry, order fulfillment, demand forecasting, supply chain management, enterprise resource management, and/or human resource management. Such applications are commonly provided by companies such as SAP, BAAN, Peoplesoft, and the like. The input to and/or output from an application, along with its functions, are also information that may be displayed in a user interface.

In particular embodiments, server 140 delivers user-centric collaboration through unification, which allows data and relationships to be accessed and traversed through a virtual metadata layer. Unification provides contextual navigation that greatly reduces the time it takes to resolve an event of which a user becomes aware. It does this by breaking monolithic applications into building blocks that an organization can combine into elaborate solutions. In certain embodiments, unification is applicable to transaction and legacy systems. The transaction and legacy systems may be unified by unifiers from companies such as PeopleSoft, Siebel, Oracle, Baan, and SAP.

In certain embodiments, events use bean-like characters that have a base class. Moreover, specific events may correspond to specific actions. Additionally, events may render themselves, and the event may be registered with an event manger.

Figure 2:
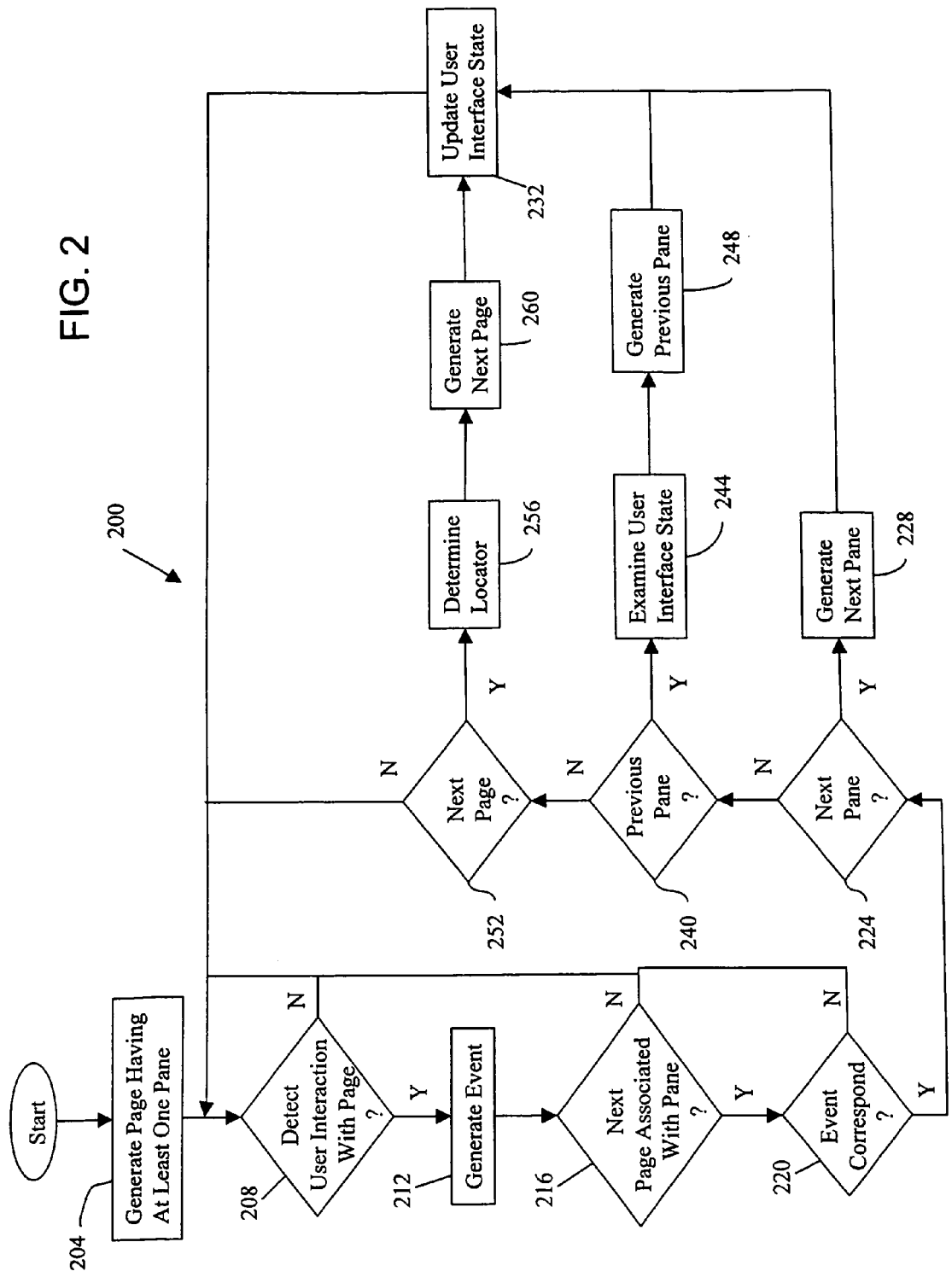
FIG. 2 is a flowchart illustrating a method for managing a user interface in accordance with a one embodiment of the present invention.

FIG. 2 is a flowchart illustrating a method 200 for managing a user interface in accordance with a one embodiment of the present invention. The method begins at decision block 204 with generating a page having at least one pane. A page may be generated, for example, by examining a configuration file for pane and controller information. The page may then be sent to a user interface device for display.

At decision block 208, the method calls for waiting to detect user interaction with the page, or a portion thereof. Detecting user interaction with the page could, for example, consist of receiving a message indicating that a user has interacted with the page in a certain manner, such as, for instance, activating a button. A user interface navigation state could accompany or be part of the message. Upon detecting user interaction with the page, the method calls for generating an event based on the interaction at function block 212. The event could be fired from a controller, for example.

At decision block 216, the method calls for determining whether there is a next page function associated with the pane with which the event is associated. Determining whether there is a next page function associated with the pane with which the event is associated may be accomplished, for example, by examining a configuration file associated with the page. If there is not a next page function associated with the pane, the method calls for returning to decision block 208 to wait to detect another user interaction with the page. If, however, there is a next page function associated with the pane, the method calls for determining whether the event corresponds to a next page function for the pane at decision block 220. An event may correspond to a next page function, for example, if the event is of an appropriate type and was generated from an appropriate control. If the event does not correspond to a next page function for the pane, the method calls for returning to decision block 208.

If, however, the event does correspond to a next page function for the pane, the method calls for determining whether the event corresponds to a next pane function at decision block 224. Determining whether the event corresponds to a next pane function may, for example, be accomplished by examining an associated configuration file. If the event corresponds to a next pane function, the method calls for generating the next pane at decision block 228. Generating the next pane may include determining panes and/or controls for the pane and rendering them. Note that the next pane may be a previously used pane. The next pane may then be sent to the user display device for display in the page. At function block 232, the method calls for updating the user interface state. In this instance, the user interface state would be updated to reflect replacement of a pane in the page with the next pane. The user interface state could then be returned to the user interface device. Returning the user interface state may, for example, be accomplished by sending the user interface state with the next pane information. The method then calls for returning to decision block 208.

If the event does not correspond to a next pane function, however, the method calls for determining whether the event corresponds to a previous pane function at decision block 240. Determining whether the event corresponds to a previous pane function may, for example, be accomplished by examining an associated configuration file. If the event corresponds to a previous pane function, the method calls for examining the user interface state at function block 244. The user interface state may be examined to determine what previous pane is to be used to replace a current pane. The method calls for generating the previous pane at function block 248. The previous pane may then be sent to the user display device for display in the page. The method continues with updating the user interface state at function block 232. In this instance, however, the user interface state would be updated to reflect the replacement of a pane with a previous pane. The user interface state may then be returned to the user interface device. The method then calls for returning to decision block 208.

If the event does not correspond to a previous pane function, however, the method calls for determining whether the event corresponds to a next page function at decision block 252. Determining whether the event corresponds to a next page function may, for example, be accomplished by examining an associated configuration file. If the event does not correspond to a next page function, the method calls for returning to decision block 208. But if the event corresponds to a next page function, the method calls for determining a locator for the next page at function block 256. A locator may be a URL, for example. The method continues with generating the next page at function block 260. A page may be generated by examining an appropriate configuration file, for example. The next page may then be sent to a user display device for display. The method again calls for updating the user interface state at function block 232. In this instance, however, the user interface state would be updated to reflect that a new page was initiated. The user interface state may then be returned to the user interface device. The method then calls for returning to decision block 208.

Although FIG. 2 illustrates a method for managing a user interface in accordance with one embodiment of the present invention, other embodiments may include less, more, and/or a different arrangement of operations. For example, in certain embodiments, a page may not have to be generated, especially if the page already exists. As another example, in some embodiments, a determination of whether there is a next page function associated with the pane may not have to be performed. As a further example, in particular embodiments, the order of checking for a next pane function, a previous pane function, and/or a next page function may be altered. As an additional example, in certain embodiments, the navigation state may be updated before generating the next pane, previous pane, and/or next page. As another example, in some embodiments, the method includes displaying the page. A variety of other examples exist.

Figure 3:
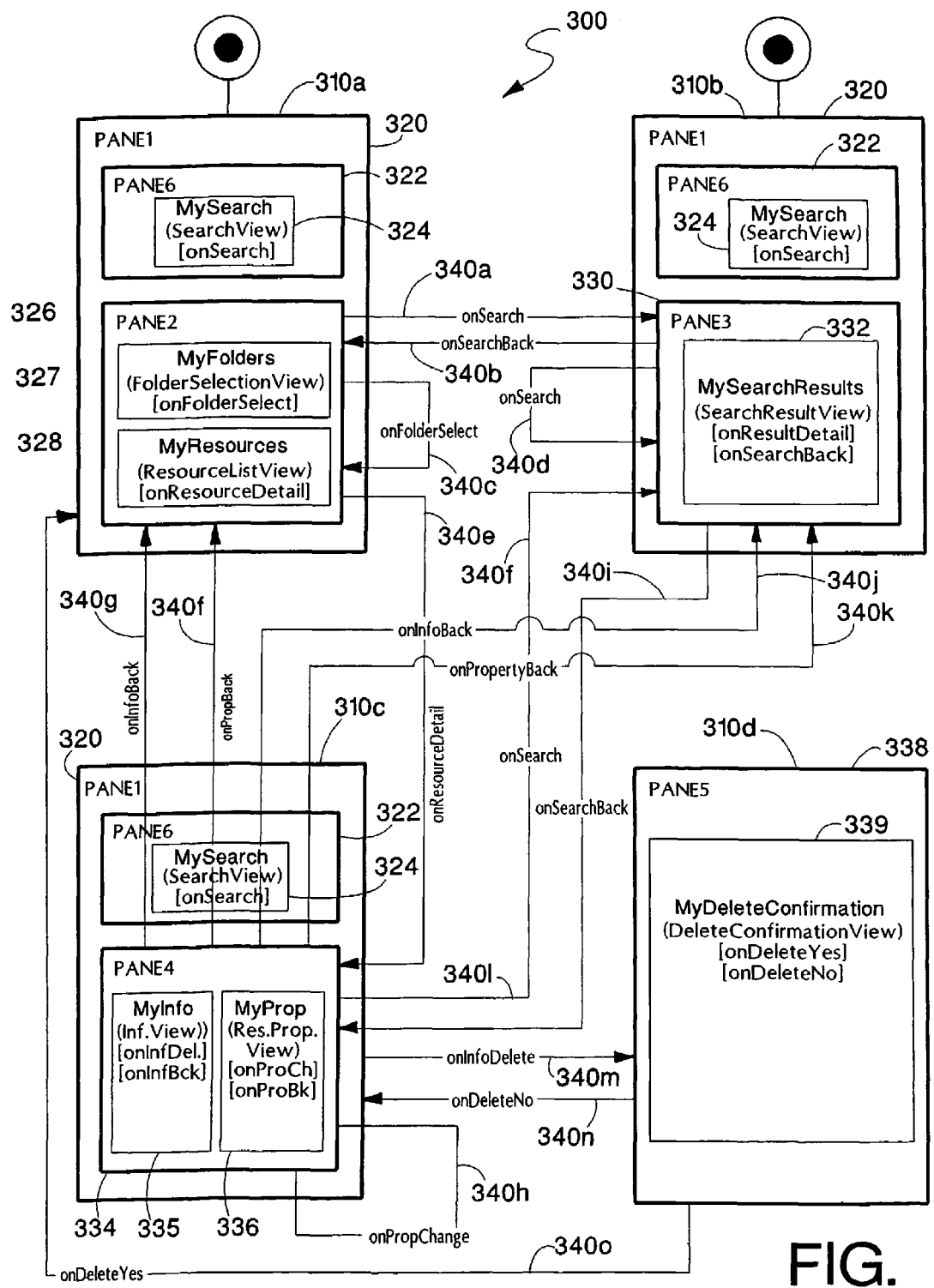
FIG. 3 is a flow diagram illustrating a user interface in accordance with one embodiment of the present invention.

FIG. 3 is a flow diagram illustrating a user interface 300 in accordance with one embodiment of the present invention. As illustrated, user interface 300 includes four screens 310, each of which includes a variety of panes and controls.

Screen 310a includes a pane 320, which itself includes a pane 322 and a pane 326. Pane 322 includes a control 324, which contains information regarding searching, and pane 326 includes a pane 327 and a pane 328, which contain information regarding folders and resources. The folders and resources could be part of an exchange infrastructure, for example.

Screen 310b includes pane 320, which includes pane 322 and a pane 330. As before, pane 322 includes control 324. Pane 330 includes a control 332, which contains information regarding search results.

Screen 310c includes pane 320, which includes pane 322 and a pane 334. As before, pane 322 includes control 324. Pane 334 includes a control 335 and a control 336, which contain detailed information regarding resources.

Screen 310d includes a pane 338. Pane 338 includes a control 339, which contains information regarding the deletion of information.

Traversing between screens 310 are flow lines 340. Flow lines 340 illustrate the flow between screens 310. For example, if user interface 300 is displaying screen 310a, and a user selects a search function, the flow progresses from screen 310a to screen 310b, following flow line 340a. In the interim, however, the underlying user interface device has sent a message regarding the selected function to a server, a control associated with pane 322 has generated an event, a controller has evaluated the event to determine how to respond and determined that pane 330 should be substituted for pane 326, a control has been selected for pane 330, the control has been rendered, and information regarding the control has been conveyed to the user interface device. As another example, if a user selects a search back function in screen 310b, the flow may return to screen 310a, following flow line 340b.

Note, however, that there is another flow line associated with the selection of a search back function in screen 310b—flow line 340i, which leads to screen 310c. Thus, it must be determined which of screen 310a and screen 310c screen 310b followed so that the return will be appropriate. This is the function of the previously mentioned user interface state. The state tracks the progress of a user through the user interface so that the appropriate screens may be displayed.

In particular embodiments, a user interface navigation state is maintained by the use of a stack structure. In general, the stack may operate by having a pane placed on the stack when it is to be displayed in the user interface. This may be accomplished by using a push operation. Additionally, if a previously displayed pane is to be displayed again, that pane may be retrieved from the stack. This may be accomplished by using a pop operation. The stack structure allows the previous panes to be easily found. For example, if a pane may be arrived at by either of two other panes, determining which pane to return to if a return event is detected may be accomplished by finding the most recent of the two possible initiating panes.

In certain embodiments, the stack has only small data size due to the fact that most of the information can be restored from a configuration file. Thus, the stack may hold only references to panes and not the panes themselves. In some embodiments, each pane has its own stack. Thus, the controls in the pane can be stacked, providing the ability to go back to previous controls.

As an example, the state of an application may consist of two kinds of data: 1) navigation state; and 2) control state. The first kind may be readily enfolded into a stack structure. For instance, consider a screen that has a pane P1 with inner panes P2 and P3 and a screen that has a pane P1 with inner panes P2 and P4. The navigation state in which pane P3 was replaced by pane P4 may look something like: P1(P2( ), P3( )); P1(P2( ), P4( )). This may be all the information that is required to restore the navigation state. Missing information, like which pane displays which control, can be retrieved from the configuration file. Additionally, the control state may be defined by the application. Thus, the navigation state can be extended by this data. As an example of extension, a control C1 with a checkbox in pane P2 could be viewed as P1(P2(c1 (x1=false)), p3( . . . )); P1(P2(c1(x1=true)), p4( . . . )). Thus, on the initial screen, the checkbox is unchecked, x1=false, and on the next screen, the checkbox is true, x1=true. A serialization mechanism may be used to read all bean properties of a control automatically after each request and to transfer collected data to the screen. For each new request, this mechanism works in the opposite direction and restores the bean state automatically again.

FIGS. 4A-B provide an example of a configuration file 400 that may be used to facilitate specification of a flow similar to that illustrated in FIG. 3. As illustrated, configuration file 400 is written in XML, but it could be in any appropriate programming language. Moreover, note that the called functions and/or classes could be from any appropriate vendor.

FIG. 4A illustrates the specification of a page for a user interface. As illustrated, file 400 has sections 410, each of which defines a pane. For example, the first line of section 410a specifies an identifier for a pane—Pane1—and defines the layout of components in the pane. Section 410a also includes a subsection 412. Subsection 412 specifies the components of the pane. In this instance, the components are other panes—Pane2 and Pane3, which are defined in section 410b and section 410c, respectively. As a further example, the first line of section 410b also specifies an identifier for a pane—Pane2, in this instance—and defines the layout of components in the pane. Additionally, section 410b includes a subsection 422 that specifies the components in the pane, controls in this instance, which will be discussed with respect to FIG. 4B.

Sections 410 also specify the next page functions, if any, that occur in response to certain user interactions with the user interface. For example, section 410c contains a subsection 432 that specifies the components of the associated pane and a subsection 434 that specifies the next page functions associated with the pane. As another example, section 410d contains a subsection 442 that specifies the components of the associated pane and a subsection 444 that specifies the next page functions associated with the pane.

In more detail, subsection 434 includes portion 435a and portion 435b, each of which corresponds to a different next page function. The first line of portion 435a and portion 435b specify the event and producing control associated with the next page function. For example, for portion 435a, the corresponding event is a back navigation event and the producing control is Control3. The second line of portion 435a and portion 435b specify the response to the event being produced by the designated control. For portion 435a, a previous pane function is initiated with a popCount of one, which may be used when the user interface navigation state is stored in a stack. Thus, the navigation stack will be popped to determine the appropriate pane. Note that the stack may be popped more than one to return to earlier panes. For portion 435b, a next pane function is initiated. To accomplish this, the next pane is identified—Pane4 in this instance—and the current pane is pushed onto the stack, to allow for a pervious pane function in the future.

Note that there may be occasions when a pane is not pushed onto a stack when proceeding from one pane to another pane. For example, when backward navigation is not possible— when proceeding through a series of panes without possibility of returning back through the panes, for instance—pushing panes onto the stack results in unnecessary data in the stack. Thus, the push function may not be used.

FIG. 4B illustrates the specification of controls for a user interface. To specify the controls for a user interface, file 400 defines the controls and may define parameters for controls. As illustrated, file 400 has sections 450, each of which defines a control. The first line in each of sections 450 specifies an identifier for a control and a class for the control. Sections 450 may also have subsections for specifying more detailed information about the controls—parameters. For example, section 450a has a subsection 462 in which parameters for the associated control are specified. For instance, the parameter "MyParameterAsString" has been assigned the value of "Abc." As another example, section 450d has a subsection 494 in which an event filter for the control has been specified. Thus, for the control defined in section 450d—Control4—if a counter event is generated by Control5, Control4 will ignore the event.

Although FIG. 4 provides an example of a configuration file that may be used to facilitate specification of a flow similar to that in FIG. 3, other embodiments may use a different programming language, format, order, and/or syntax. For example, in some embodiments, next page functions may not be specified inside panes. As another example, in particular embodiments, parameters of a control may not be specified in the configuration file. As another example, in certain embodiments, a control may not have a filter. A variety of other examples exist.

Figure 5:
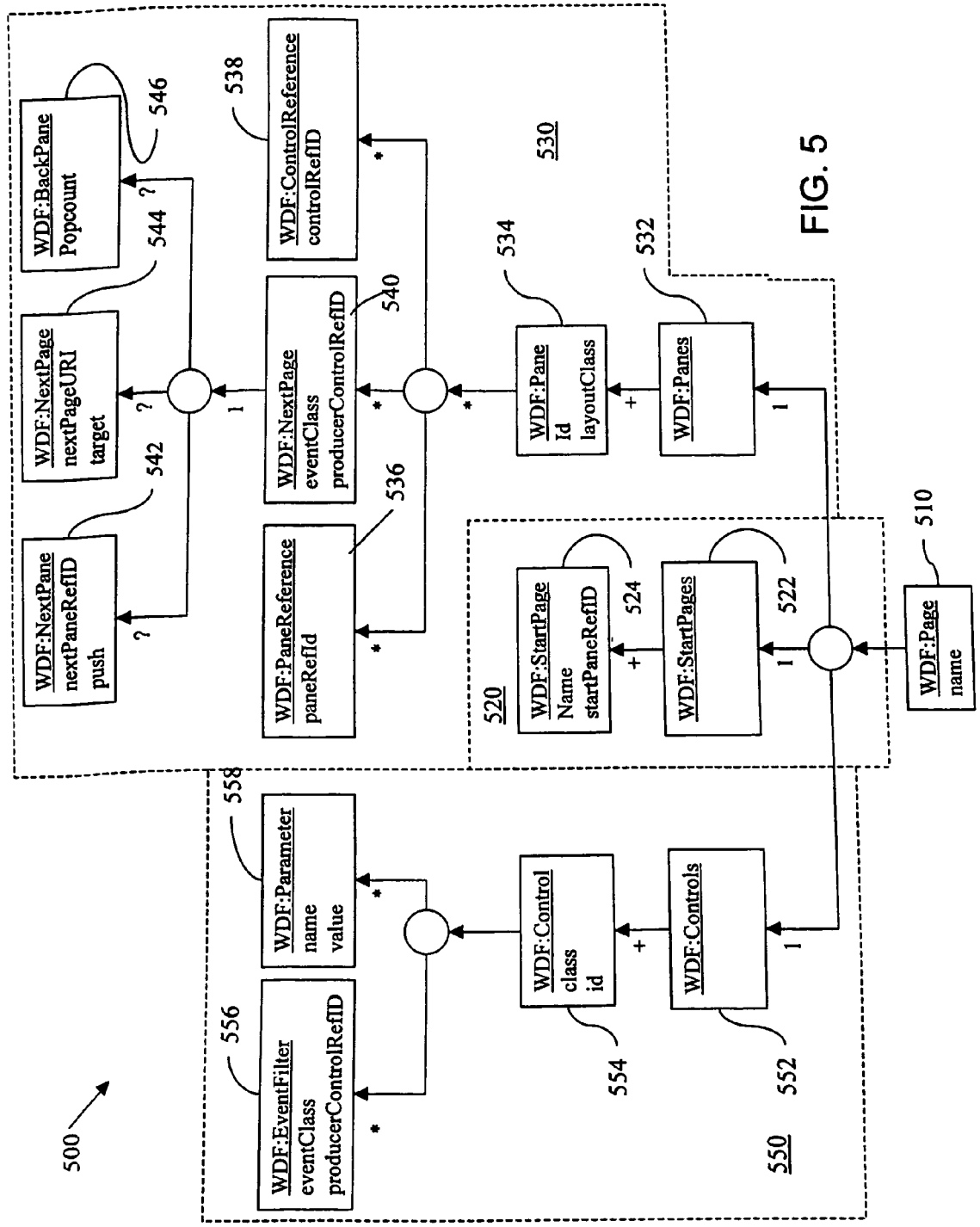
FIG. 5 illustrates a document type definition that may be used in forming a configuration file similar to the one illustrated in FIGS. 4A-B.

FIG. 5 illustrates a document type definition (DTD) 500 that may be used in forming a configuration file similar to the one illustrated in FIGS. 4A-B. Essentially, DTD 500 specifies the grammar that a configuration file should have. In particular embodiments, a DTD may even be used for validation purposes.

As illustrated, DTD 500 has a component 510, a first section 520, a second section 530, and a third section 550. Component 510 indicates the beginning of a page for a user interface. In component 510, the name of the page may be specified. First section 520 specifies the beginning page of the user interface. Second section 530 specifies the panes for the page and any associated controls and next page functions. Third section 550 specifies the controls for the page.

In more detail, section 520 contains a component 522 that indicates that the beginning page will have its own section in the configuration file. Note that the beginning page would typically only have one such section. Section 520 also includes a component 524 in which the beginning page is given a name and an identifier. An example of an associated portion of a configuration file is "<WDF:StartPage name="Homepage" startPaneRefID="Pane1"/>." Section 520 may contain one or more such start pages.

Section 530 includes a component 532 that indicates panes will have their own section in the configuration file. Note that the panes would typically only have one such section. Section 530 also includes a component 534 in which a pane for the page would be specified. Specification of a pane could include giving the pane an identifier and associating a layout class with the pane. An example of an associated portion of a configuration file is "<WDF:Pane id="Pane1" layoutClass="com.sap.wcm.wdf.layout.HorizontalLayout">."

Note that the first pane specified may be a root pane. In an initial request, the root pane is the start pane that is to be identified in the configuration filed. Another request can then exchange another pane for the root pane or a nested sub-pane.

A pane may contain one or more of component 536, component 538, and/or component 540. Component 536 allows a pane associated with a pane to be specified. An example of an associated portion of a configuration file is "<WDF:PaneReference paneRefID="Pane2"/>." A pane may have any number of panes associated with it. For example, in FIG. 3, pane 320 has pane 322 and pane 326 associated with it. Component 538 allows a control associated with a pane to be specified. An example of an associated portion of a configuration file is "<WDF:ControlReference controlRefID="Control1"/>." A control reference may basically be a pointer to a control. A pane may have any number of controls associated with it. Component 540 allows a next page function associated with a pane to be specified. An example of an associated portion of a configuration file is "<WDF:NextPage eventClass="com.sap.wcm.wdf.event.WdfBackEvent" producerControlRefID="Control3"/>." Thus, specifying a next page event in the example includes specifying the event that will trigger the next page function as well as the control that produced the event. A pane may have any number of next page events associated with it.

A next page function may have one of component 542, component 544, and component 546, which allow the specification of the operations for a next page function, associated with it. Thus, if a pane has a next page function associated with it, the next page function may be defined by one of these components. Component 542 allows for the specification of a next pane function. This function calls for the specification of the identifier for the next pane as well as possibly setting a variable to push the current pane onto a navigation stack. An example of the specification in a configuration file is "<WDF:NextPane nextPaneRefID="Pane4" push="true"/>." The identifier may be a pointer to the next pane. Component 544 allows for the specification of a next page for the user interface. This function calls for the specification of the identifier for the next page and a target. Component 546 allows for the specification of a previous pane function. This function calls for the specification of the location to return to in the navigation stack. An example of the specification is "<WDF:BackPane popCount="1"/>."

Section 550 includes a component 552 that indicates that the controls will have their own section in the configuration file. Note that the controls would typically only have one such section. Section 550 also includes a component 554 that allows the specification of a control. A page may have one or more specified controls. An example of a specification for a control is "<WDF:Control id="Control2" class="com.sap.wcm.wdf.testcontrols.Control2">."

Each specified control may contain one or more of component 556 and/or component 558. Component 556 allows an event filter to be specified for a control. As illustrated, an event filter is specified by indicating the event and the producer of the event. An example of the specification of an event filter in a configuration file is "<WDF:EventFilter eventClass="com.sap.wcm.wdf.CounterEvent" producerControlRefID="Control3"/>." Component 558 allows a parameter associated with a control to be specified. For instance, a control may have a parameter for setting the background color of the control. Each instance of the control would then have this parameter. As illustrated, a parameter is specified by indicating its name and value. An example of the specification of an event filter in a configuration file is "<WDF:Parameter name="MyParameterAsString" value="Abc"/>."

DTD 500 allows a configuration bill to readily be configured and the format of a configuration file to be readily understood. Moreover, DTD 500 may allow the configuration file to be validated. In particular embodiments, it may be possible to draw a page flow diagram as in FIG. 3 and have the configuration file generated automatically based on the DTD. In general, any language format that allows you to define grammar rules and to validate a file based on those rules could be used.

Figure 6:
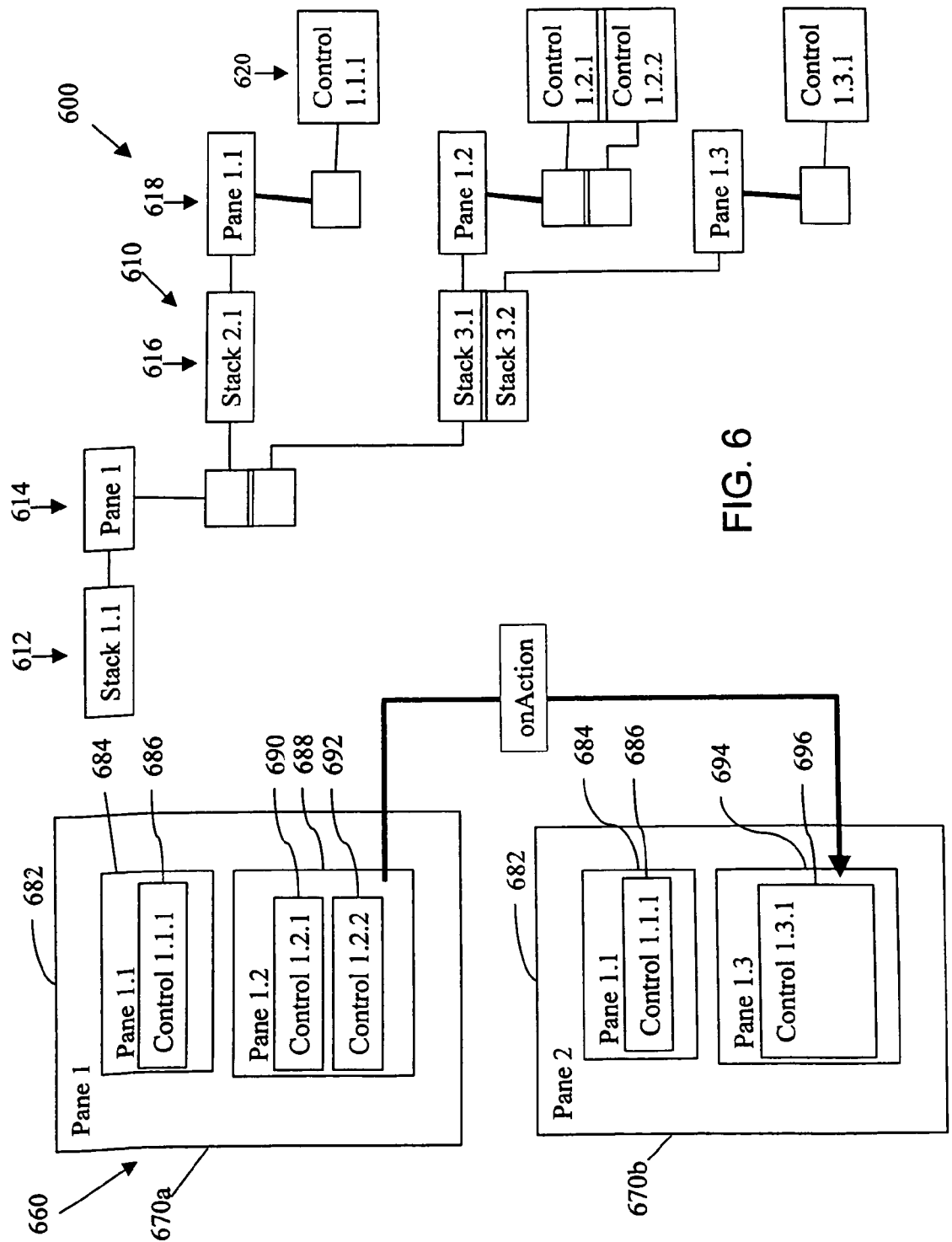
FIG. 6 illustrates a user interface state in accordance with one embodiment of the present invention.

FIG. 6 illustrates a user interface state 600 in accordance with one embodiment of the present invention. As illustrated, state 600 is stored in a stack structure 610 that reflects the navigation through the user interface. In more detail, stack 610 is a recursive data structure that nests list structures into stack entries. Each list entry may contain another stack that can contain another list structure.

State 600 illustrates the navigation through a user interface 660. User interface 660 includes a first screen 670a and a second screen 670b. Screen 670a includes a pane 682. Pane 682 includes a pane 684, which contains a control 686, and a pane 688, which contains a control 690 and a control 692. Screen 670b includes pane 682, which contains pane 684, including control 686, and a pane 694, which contains a control 696. Screen 670b is displayed when a certain action associated with screen 680a has occurred, denoted "onAction" in the illustrated embodiment.

Stack 610 includes a first level 612 that begins a stack for screen 670a, a second level 614 that indicates the outer pane(s) for screen 670a, a third level 616 that begins a stack for the components of the outer pane(s), a fourth level 618 that indicates the components of the outer pane(s), and a fifth level 620 that indicates components of the components of the outer pane(s). Thus, as illustrated, second level 614 indicates pane 682, fourth level 618 indicates pane 684, pane 688, and pane 694, and fifth level 620 indicates control 686, control 690, control 692, and control 696.

Note that the entries in stack 610 may simply contain pointers to the appropriate panes and/or controls to compose a screen. Storing pointers to the proper panes and/or controls reduces the size of the stack. Moreover, the entries may contain the data that was entered by a user for a control. Thus, if data is entered in a pane and the pane is replaced by another pane, upon returning to the first pane, the data may still be present.

State 600 indicates that screen 670a was displayed first, followed by screen 670b. This can be observed by the addition of the third stack in third level 616. A user interaction associated with the "onAction" event generated the third stack in third level 616 and pushed information about pane 694 onto the stack. Now, if a user interaction indicates a return to screen 680a, the third level may be popped to return pane 688.

In particular embodiments, error messages may also be included into the stack structure. For example, if an exception occurs on an action, an error stack may be generated and pushed into the third level. The error stack could include an error pane on the fourth level and an error control on the fifth level, for example. Upon receiving notice of user acknowledgement of the error condition, the previous screen could be returned to by popping the stack.

Figure 7:
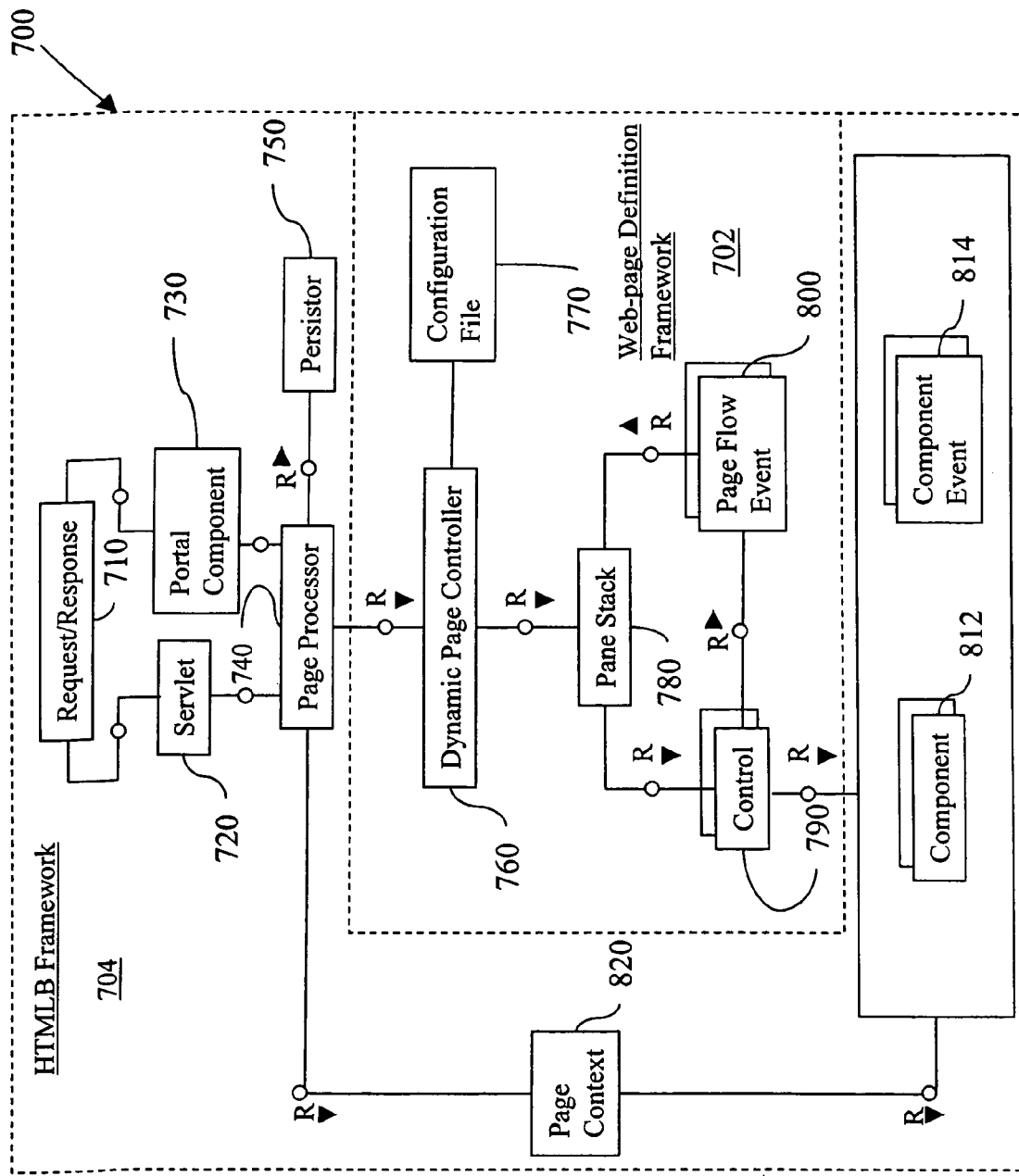
FIG. 7 is a block diagram illustrating a system for managing a user interface in accordance with one embodiment of the present invention.

FIG. 7 is a block diagram illustrating a system 700 for managing a user interface in accordance with one embodiment of the present invention. In general, system 700 illustrates a Web-page definition framework (WDF) 702 working with an HTMLB framework 704. Of course, WDF framework 702 may be used with any other appropriate type of Web-page framework.

In operation, a user interface is initiated by calling servlet 720 with the name of the appropriate configuration file and the appropriate start page identifier. When servlet 720 receives the request, it generates a process request, which is passed to dynamic page controller 760, which is a derived class that has the role of a controller. Controller 760 reads configuration file 770 and instantiates the appropriate controls 790. Controls 790 are rendered using HTMLB.

When user interaction with the user interface occurs, by the selection of a button at the user interface device, for example, a request 710 is passed to page processor servlet 720 or to page processor portal component 730. Servlet 720 or portal component 730 uses page processor 740 to handle the request. Processor 740 creates a new HTMLB dynamic page that is a specialized WDF controller dynamic page for each request. The new page defines the stateless character of the application. Controller 760 reads configuration file 770, which may be an XML file, and creates an initial pane stack 780 consisting of controls 790. Each control 790 creates a component tree in page processor 740 that is passed back to page context 820 and that is rendered by processor 740 and returns a response 710 by servlet 720 or portal component 730. Processor 740 uses persistor 750 to transfer state data to the page.

An interactive HTMLB component 812, such as a link of button, for example, can render event information to a page. If this event information is received by processor 740, it calls a generic event handler that dispatches the event to dynamic page controller 760. Dynamic page controller 760 has another generic handler that dispatches the event to controls 790. The appropriate controls 790 can handle the event and read input data from page context 820. The control transfers the event to one of component events 814 and passes it back to the dynamic page controller 760. Dynamic page controller 760 modifies pane stack 780 and rendering starts again.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural language, in object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Portions of this disclosure discuss a framework for a configurable user interface. Other portions discuss a way to dynamically track user interface navigation state. Still other portions discuss ways to construct a configuration file for a user interface. Yet other portions discuss the configuration of a user interface. Moreover, aspects of these portions may be combined in various combinations with each other. Furthermore, the logic flows depicted and discussed do not require the particular order shown, or even sequential order, to achieve desirable results. For instance, in certain implementations, multitasking and parallel processing may be preferable.

Other embodiments may be within the scope of the following claims.

What is claimed is:

1. A method for a server to manage a user interface presented at a remote device, the method comprising:

generating a page for the user interface, the page comprising a pane;

receiving, from the user interface, an indication of user interaction with a portion of the page of the user interface;

determining an event associated with the indicated interaction; and selectively generating, at the server, a replacement pane based on the event determination, a configuration file defining flow information from the pane to the replacement pane and a layout of the page including the replacement pane, and the state of the user interface, the state of the user interface representative of a status of an interaction between the user interface and an application at the server, the state of the user interface further comprises a navigation state stored in a stack structure representative of a data structure, and examining the state by popping the stack structure to determine information about the state of the user interface; and sending the replacement pane and the state to the user interface at the remote device to enable the user interface to update the pane with the replacement pane and update a stored state of the user interface.

2. The method of claim 1, wherein selectively generating the replacement pane based on the event determination and the state of the user interface comprises:
   determining whether the event is associated with replacing the pane; and
   generating the replacement pane if the event is associated with replacing the pane.

3. The method of claim 1, wherein selectively generating the replacement pane based on the event determination and the state of the user interface comprises determining whether a previously used pane should replace the pane.

4. The method of claim 3, wherein selectively generating the replacement pane comprises examining the user interface state to determine information about the previously used pane.

5. The method of claim 4, further comprising:
   receiving from the user interface the user interface state;
   updating at the server the user interface state; and
   sending from the server to the user interface the user interface state.

6. The method of claim 5, wherein the user interface state is included with a message containing information regarding the replacement pane.

7. The method of claim 1, wherein selectively generating the replacement pane based on the event determination and the user interface state comprises determining whether another pane should replace the pane.

8. The method of claim 7, further comprising placing information about the replacement pane in the user interface state.

9. The method of claim 8, wherein the user interface state comprises a navigation state stored in a stack structure, and placing information about the replacement pane in the user interface state comprises pushing information about the replacement pane onto the stack structure.

10. The method of claim 1, wherein selectively generating the replacement pane based on the event determination and the user interface state comprises examining a configurable file.

11. The method of claim 1, further comprising:
   determining whether the event is associated with a different page; and
   generating the different page if the event is so associated.

12. The method of claim 1, further comprising sending the generated page to a user interface device.

13. The method of claim 1, further comprising:
   embedding data in an event; and
   sending the event to a plurality of controls.

14. The method of claim 13, wherein a control is operable to filter an event and to extract data from the event.

15. A system for managing a user interface presented at a remote device, comprising:
   a processor; and
   a memory, wherein the processor and memory are configured to provide
   an application framework operable to:
      generate a page for the user interface, the page comprising a pane,
      receive, from the user interface, an indication of user interaction with a portion of the page of the user interface, and
      determine an event associated with the indicated interaction; and
   a controller, at the server, operable to selectively generate a replacement pane based on the event determination, a configuration file defining flow information from the pane to the replacement pane and a layout of the page including the replacement pane, and the state of the user interface, the state of the user interface representative of a status of an interaction between the user interface and an application at the server, the state of the user interface further comprises a navigation state stored in a stack structure representative of a data structure, and examining the state by popping the stack structure to determine information about the state of the user interface.

16. The system of claim 15, wherein selectively generating the replacement pane based on the event determination and the user interface state comprises:
   determining whether the event is associated with replacing the pane; and
   generating the replacement pane if the event is associated with replacing the pane.

17. The system of claim 15, wherein selectively generating the replacement pane based on the event determination and the user interface state comprises determining whether a previously used pane should replace the pane.

18. The system of claim 17, wherein selectively generating the replacement pane comprises examining the user interface state to determine information about a previously used pane.

19. The system of claim 18, wherein the controller is further operable to:
   receive the user interface state;
   update the user interface state; and
   send the user interface state.

20. The system of claim 19, wherein the user interface state is included with a message containing information regarding the replacement pane.

21. The system of claim 18, wherein the user interface state comprises a navigation state stored in a stack structure, and examining a user interface state comprises popping the stack structure to determine information about a previously used pane.

22. The system of claim 15, wherein selectively generating the replacement pane based on the event determination and the user interface state comprises determining whether another pane should replace the pane.

23. The system of claim 22, wherein the controller is further operable to place information about the replacement pane in the user interface state.

24. The system of claim 23, wherein the user interface state comprises a navigation state stored in a stack structure, and placing information about the replacement pane in a user interface state comprises pushing information about the replacement pane onto the stack structure.

25. The system of claim 15, wherein selectively generating the replacement pane based on the event determination and the user interface state comprises examining a configurable file.

26. The system of claim 15, wherein the controller is further operable to:
   determine whether the event is associated with a different page; and
   generate the different page if the event is so associated.

27. The system of claim 15, wherein the application framework is further operable to send the generated page to a user interface device.

28. The system of claim 15, wherein the application framework is further operable to:
   embed data in an event; and
   send the event to a plurality of controls in the application framework.

29. The system of claim 28, wherein a control is operable to filter an event and to extract data from the event.

30. An article comprising a machine-readable medium storing instructions operable to cause a server to perform operations for managing a user interface presented at a remote device, the operations comprising:
- generating a page for the user interface, the page comprising a pane;
- receiving, from a user interface, an indication of user interaction with a portion of the page of the user interface;
- determining an event associated with the indicated interaction; and
- selectively generating, at the server, a replacement pane based on the event determination, a configuration file defining flow information from the pane to the replacement pane and a layout of the page including the replacement pane, and the user interface state, the state of the user interface representative of a status of an interaction between the user interface and an application at the server, the state of the user interface further comprises a navigation state stored in a stack structure representative of a data structure, and examining the state by popping the stack structure to determine information about the state of the user interface; and
- sending the replacement pane and the state to the user interface at the remote device to enable the user interface to update the pane with the replacement pane and update a stored state of the user interface.

31. The article of claim 30, wherein selectively generating the replacement pane based on the event determination and the user interface state comprises:
- determining whether the event is associated with replacing the pane; and
- generating the replacement pane if the event is associated with replacing the pane.

32. The article of claim 30, wherein selectively generating the replacement pane based on the event determination and the user interface state comprises determining whether a previously used pane should replace the pane.

33. The article of claim 32, wherein selectively generating the replacement pane comprises examining a user interface state to determine information about a previously used pane.

34. The article of claim 33, wherein the instructions are further operable to cause the server to perform operations comprising:
- receiving the user interface state;
- updating the user interface state; and
- sending the user interface state.

35. The article of claim 34, wherein the user interface state is included with a message containing information regarding the replacement pane.

36. The article of claim 33, wherein the user interface state comprises a navigation state stored in a stack structure, and examining a user interface state comprises popping the stack structure to determine information about a previously used pane.

37. The article of claim 31, wherein selectively generating the replacement pane based on the event determination and the user interface state comprises determining whether another pane should replace the pane.

38. The article of claim 37, wherein the instructions are further operable to cause the server to perform operations comprising placing information about the replacement pane in a user interface state.

39. The article of claim 38, wherein the user interface state comprises a navigation state stored in a stack structure, and placing information about the replacement pane in a user interface state comprises pushing information about the replacement pane onto the stack structure.

40. The article of claim 30, wherein selectively generating the replacement pane based on the event determination and the user interface state comprises examining a configurable file.

41. The article of claim 30, wherein the instructions are further operable to cause the server to perform operations comprising:
- determining whether the event is associated with a different page; and
- generating the different page if the event is so associated.

42. The article of claim 30, wherein the instructions are further operable to cause the server to perform operations comprising sending the generated page to a user interface device.

43. The article of claim 30, wherein the instructions are further operable to cause the server to perform operations comprising:
- embedding data in an event; and
- sending the event to a plurality of controls.

44. The article of claim 43, wherein a control is operable to filter an event and to extract data from the event.

* * * * *

UNITED STATES PATENT AND TRADEMARK OFFICE
CERTIFICATE OF CORRECTION

PATENT NO.       : 7,620,908 B2                              Page 1 of 1
APPLICATION NO.  : 10/330036
DATED            : November 17, 2009
INVENTOR(S)      : Klevenz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Twenty-sixth Day of October, 2010

David J. Kappos
*Director of the United States Patent and Trademark Office*